Patented Oct. 13, 1953

2,655,506

UNITED STATES PATENT OFFICE 2,655,506

PYRAZOLE COMPOUNDS

Reuben G. Jones, Indianapolis, Ind., assignor to Eli Lilly and Company, Indianapolis, Ind., a corporation of Indiana No Drawing. Application November 16, 1950, Serial No. 196,093

3 Claims. (Cl. 260—310)

This invention relates to substituted pyrazole bases and their acid addition salts.

The bases of the novel compounds of this invention can be represented by the formula

wherein R is a substituent of the group consisting of hydroxymethyl, higher halomethyl, cyanomethyl, carboxymethyl, lower carbalkoxymethyl, and carboxyamidomethyl radicals. By the term "higher halomethyl" as used herein, is meant chloromethyl, bromomethyl and iodomethyl; and by the term "lower carbalkoxymethyl" is meant carboxymethyl esters with lower alkyl radicals, i. e. alkyl radicals having less than about 7 carbon atoms.

It should be noted that two isomeric forms of the pyrazole compounds exist because of a dynamic equilibrium. Thus, the compounds can be represented by either of the following formulas:

Formula A          Formula B

     

wherein R has the same significance as before. The two forms of the pyrazole compounds as represented by the given formulas are equivalent, and both are within the scope of this invention. For the purpose of convenience, the form of Formula A will be employed exclusively in this specification and the appended claims.

The novel pyrazole bases of this invention are liquids or low-melting solids. Those pyrazole bases containing hydroxymethyl, halomethyl, aminoethyl, cyanomethyl, and carbalkoxymethyl substituents are liquids at ordinary temperatures, and those containing carboxymethyl, and carboxamidomethyl substituents are solids.

Because of the basic nitrogen atom in the pyrazole ring, the pyrazoles readily form acid addition salts. The salts are readily prepared by methods commonly employed for preparing acid addition salts of organic bases. Suitable methods include the reaction of the stoichiometric equivalent of the desired acid with the desired free base in a mutual solvent, followed by evaporation of the solvent; the displacement of the acid of an acid addition salt of the desired base by another acid; and the like. Examples of acids useful for the purpose of forming salts with the novel bases include inorganic acids such as hydrochloric, hydrobromic, hydriodic, sulfuric, nitric, sulfamic, and phosphoric acids, and organic acids such as picric, acetic, maleic, tartaric, succinic, benzoic, lactic, and salicylic acids.

The novel compounds of this invention have various utilities including useful physiological activities, and usefulness as intermediates for the preparation of compounds having physiological activity. Illustratively, 3-cyanomethylpyrazole is an intermediate in the preparation of 3-(β-aminoethyl)-pyrazole, a gastric secretory stimulator; 3-chloromethylpyrazole is a powerful dermal irritant and vesicant; and 3-hydroxymethylpyrazole is a relatively non-toxic mild analgesic, and has emulsifying properties.

The following specific examples further illustrate this invention.

EXAMPLE 1

*3-hydroxymethylpyrazole*

28 g. of ethyl 3-pyrazolecarboxylate, prepared by the esterification of 3-pyrazolecarboxylic acid (Knorr, Ann. 279, 231, 1894) with ethanol and hydrogen chloride, were placed in a Soxhlet thimble above a refluxing solution of 15 g. of lithium aluminum hydride in 1 liter of ether. Refluxing was continued for about 15 hours, at which time all of the ester had been extracted from the thimble and had been carried down into the lithium aluminum hydride solution. 50 cc. of water were added cautiously and with stirring to the reaction mixture to decompose excess lithium aluminum hydride, and the ether was evaporated. From the residue, a white, granular material, the 3-hydroxymethylpyrazole was isolated as follows: 300 cc. of methanol, were added to the residue and the mixture was thoroughly saturated with carbon dioxide. The mixture was then heated to boiling and filtered, and the residue from filtration was reextracted with two additional 300 cc. portions of boiling methanol. The methanol filtrates containing the 3-hydroxymethylpyrazole were combined, and evaporated in vacuo. The residue of 3-hydroxymethylpyrazole which contained a small amount of solid material, was extracted with 50 cc. of dry methanol. The methanol solution was filtered, the filtrate was evaporated, and the residual syrup was distilled in vacuo yielding the 3-hydroxymethylpyrazole in substantially pure form.

3-hydroxymethylpyrazole thus prepared boiled at about 137–140° C. at a pressure of 0.5 mm. of mercury, and had $n_D^{25}$ 1.5340 and $$d_{25}^{25}\ 1.225$$

Analysis showed the presence of 28.42 percent nitrogen as compared with the calculated amount of 28.50 percent.

EXAMPLE 2

3-hydroxymethylpyrazole hydrochloride

To an anhydrous diazomethane solution prepared in 1.5 liters of ether from 103 g. (1 mol) of nitrosomethylurea were added 56 g. (1.0 mol) of freshly distilled propargyl alcohol. The solution was allowed to stand at room temperature for about 60 hours, the ether was evaporated, and the syrupy residue was fractionally distilled in vacuo. The fraction boiling from about 120° C. to about 150° C. at a pressure of 0.5 mm. of mercury was collected. The viscous liquid consisting of crude 3-hydroxymethylpyrazole was dissolved in 50 cc. of water, and added to a solution of 80 g. of picric acid in 1200 cc. of water at 100° C. The mixture was boiled with 5 g. of decolorizing carbon, filtered and cooled to about 40° C., whereupon a yellow crystalline precipitate of 3-hydroxymethylpyrazole picrate formed. The precipitate was filtered off, washed with absolute ethanol and dried.

3-hydroxymethylpyrazole picrate thus prepared melted at 183.5–184.5° C. Analysis showed the presence of 21.43 percent of nitrogen as compared with the calculated amount of 21.44 percent.

75 g. of 3-hydroxymethylpyrazole picrate were suspended in 200 cc. of nitrobenzene, and the mixture was extracted with 50 cc. of 12 N hydrochloric acid. The hydrochloric acid layer was removed and washed with three 50 cc. portions of chloroform to recover any undecomposed picrate. The nitrobenzene and the chloroform washings were combined and again extracted with a fresh 50 cc. portion of 12 N hydrochloric acid. The combined acid extracts were filtered, and the filtrate was evaporated to dryness in vacuo. The residue, comprising 3-hydroxymethylpyrazole hydrochloride, was dissolved in absolute ethanol, and the solution evaporated to dryness in vacuo. 3-hydroxymethylpyrazole hydrochloride was obtained in the form of a very hygroscopic, white, crystalline solid. After recrystallization from absolute alcohol-ether mixture, the 3-hydroxymethylpyrazole hydrochloride melted at 117–118° C.

EXAMPLE 3

3-chloromethylpyrazole hydrochloride

To 40 cc. of thionyl chloride were added, in small portions, 30 g. (0.22 mol) of 3-hydroxymethylpyrazole hydrochloride. An immediate reaction resulted, with the formation of a clear solution. The solution was warmed on the steam bath for about 15 minutes, and the excess thionyl chloride was removed by evaporation in vacuo. A white crystalline residue comprising 3-chloromethylpyrazole hydrochloride, remained. The 3-chloromethylpyrazole hydrochloride was washed with anhydrous ether and dried in vacuo. It was stored in a vacuum desiccator over potassium hydroxide because of its deliquescent nature.

3-chloromethylpyrazole hydrochloride thus prepared melted at about 155–156° C. (dec.). Analysis showed the presence of 18.20 percent nitrogen as compared with the calculated amount of 18.31 percent.

3-chloromethylpyrazole is obtained by treating the hydrochloride salt with aqueous alkali and separating the oily free base which separates.

EXAMPLE 4

3-cyanomethylpyrazole

A solution of 60 g. of potassium cyanide in 65 cc. of water was cooled in an ice bath, and to the cold solution was added with stirring over a period of about one hour a solution of 15.3 g. (0.10 mol) of 3-chloromethylpyrazole hydrochloride in 200 cc. of absolute ethanol. The reaction mixture was removed from the cooling bath and while standing at room temperature stirred for about 4 hours. The mixture was then filtered to remove inorganic salts formed during the reaction and the residue obtained was washed with two 200 cc. portions of 95 percent alcohol. The combined filtrate and washings were reduced by evaporation in vacuo to a volume of about 100 cc. A small portion of water was added to bring the precipitated inorganic salts into solution, and the resulting mixture was extracted with four 100 cc. portions of chloroform. The chloroform extracts were combined and evaporated in vacuo leaving a liquid residue comprising 3-cyanomethylpyrazole. The residue was distilled in vacuo, and the portion boiling at about 117–120° C. at the pressure of 0.4 mm. of mercury was collected.

3-cyanomethylpyrazole thus prepared had $n_D^{25}$ 1.5138. Analysis showed the presence of 38.94 percent nitrogen as compared with the calculated amount of 39.23 percent.

EXAMPLE 5

3-carboxymethylpyrazole hydrochloride 5 g. (0.047 mol) of 3-cyanomethylpyrazole were dissolved in 25 cc. of 36 percent aqueous sodium hydroxide solution. The solution was heated on a steam bath for about sixteen hours, and was then cooled. The cooled solution was made slightly acid with aqueous hydrochloric acid, and was evaporated to dryness in vacuo, leaving a residue comprising a mixture of 3-carboxymethylpyrazole hydrochloride and sodium chloride. The residue was extracted with 25 cc. of absolute ethanol to dissolve the pyrazole compound, and the alcoholic extract was evaporated to dryness in vacuo. The residue of 3-carboxymethylpyrazole hydrochloride was taken up in hot acetone, and the solution treated with ether, whereupon a crystalline precipitate of 3-carboxymethylpyrazole hydrochloride formed. The 3-carboxymethylpyrazole was purified by recrystallization from acetone-ether mixture.

3-carboxymethylpyrazole hydrochloride thus prepared melted at about 116–117° C. Analysis showed the presence of 36.93 percent carbon, 4.80 percent hydrogen and 16.89 percent nitrogen as compared with the calculated amounts of 36.9 percent carbon, 4.31 percent hydrogen and 17.25 percent nitrogen.

3-carboxymethylpyrazole is prepared by treating the hydrochloride salt with one equivalent of aqueous alkali, evaporating the mixture to dryness and isolating the carboxy compound by extraction with ethanol, and crystallization of the 3-carboxymethylpyrazole therefrom.

EXAMPLE 6

3-carbethoxymethylpyrazole

A solution of 10 g. (0.088 mol) of 3-carboxymethylpyrazole in 100 cc. of absolute ethanol was saturated with hydrogen chloride. The reaction mixture was allowed to stand for about 18 hours. The reaction mixture was then evaporated to small volume, an excess of 5 percent aqueous sodium bicarbonate solution was added, and the aqueous solution was extracted with ether. The ether extract was evaporated leaving 3-carbethoxymethylpyrazole as an oil. The oil was fractionally distilled in vacuo, the portion boiling at 106° C. at the pressure of 0.4 mm. of mercury being collected.

3-carbethoxymethylpyrazole thus prepared was a colorless liquid, soluble in ether, and having $n_D^{25}$ 1.4870. Analysis showed the presence of 18.20 percent nitrogen as compared with the calculated amount of 18.18 percent.

3-carbethoxymethylpyrazole hydrochloride was prepared by saturating an ether solution of the pyrazole base with dry hydrogen chloride gas. The hydrochloride salt was a white, crystalline solid, melting at about 107–109° C.

EXAMPLE 7

3-carboxyamidomethylpyrazole 2 g. (0.014 mol) of methyl 3-pyrazolecarboxylate were dissolved in 20 cc. of methanol and the solution was saturated with anhydrous ammonia gas. The mixture was allowed to stand at room temperature for about 96 hours and was then evaporated to dryness in vacuo. The residue, comprising 3-carboxyamidomethylpyrazole was purified by recrystallization from alcohol-ether mixture.

3-carboxyamidomethylpyrazole thus prepared melted at about 147–149° C. Analysis showed the presence of 33.75 percent nitrogen as compared with the calculated amount of 33.60 percent.

EXAMPLE 8

3-hydroxymethylpyrazole sulfate 19.6 g. (0.2 mol) of 3-hydroxymethylpyrazole were dissolved in 50 cc. of ethanol, and a solution of 9.8 g. (0.1 mol) of sulfuric acid in 50 cc. of ethanol was added. The reaction mixture was well stirred and was then evaporated to dryness in vacuo yielding 3-hydroxymethylpyrazole sulfate as a crystalline residue.

The hydrochloric, nitric, sulfamic, phosphoric, acetic, citric, lactic, maleic, tartaric, salicylic, ascorbic, succinic and benzoic acid addition salts of 3-hydroxymethylpyrazole are prepared by substantially the same procedure as described above.

In a similar manner are prepared the acid addition salts of 3-halomethylpyrazole, 3-cyanomethylpyrazole, 3-carboxymethylpyrazole, 3-carbalkoxymethylpyrazole and 3-carboxyamidopyrazole.

I claim:

1. A compound of the group consisting of a base represented by the formula

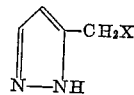

wherein X represents a halogen of the group consisting of chlorine, bromine and iodine, and acid addition salts thereof.

2. 3-chloromethylpyrazole hydrochloride.
3. 3-chloromethylpyrazole.

REUBEN G. JONES.

No references cited.